(12) United States Patent
Herbst

(10) Patent No.: US 10,839,697 B1
(45) Date of Patent: Nov. 17, 2020

(54) MULTI-MODAL CONTROL SYSTEM FOR COMMUNICATIONS AND NAVIGATION IN A TRANSPORTATION ENVIRONMENT

(71) Applicant: Richard Herbst, Lawrenceville, GA (US)

(72) Inventor: Richard Herbst, Lawrenceville, GA (US)

( * ) Notice: Subject to any disclaimer, the term of this patent is extended or adjusted under 35 U.S.C. 154(b) by 0 days.

(21) Appl. No.: 16/230,101

(22) Filed: Dec. 21, 2018

Related U.S. Application Data

(60) Provisional application No. 62/609,465, filed on Dec. 22, 2017.

(51) Int. Cl.
*G01C 21/00* (2006.01)
*G08G 5/00* (2006.01)
*H04B 1/3827* (2015.01)

(52) U.S. Cl.
CPC ......... *G08G 5/0047* (2013.01); *G08G 5/0021* (2013.01); *H04B 1/3833* (2013.01)

(58) Field of Classification Search
CPC .... G08G 5/0047; G08G 5/0021; G08G 5/025; H04B 7/18506; H04B 1/034; H04B 1/1638; H04W 4/80; H04W 4/029
See application file for complete search history.

(56) References Cited

U.S. PATENT DOCUMENTS

| | | | | |
|---|---|---|---|---|
| 4,212,067 A * | 7/1980 | Henderson | ................ | G01S 5/02 342/401 |
| 6,473,675 B2 * | 10/2002 | Sample | ................... | G01S 1/045 701/14 |
| 6,664,945 B1 * | 12/2003 | Gyde | ..................... | B64D 43/00 340/945 |
| 8,380,366 B1 * | 2/2013 | Schulte | ................. | G01C 23/00 701/120 |
| 8,909,392 B1 * | 12/2014 | Carrico | ................ | H04W 4/029 701/3 |
| 9,716,543 B2 * | 7/2017 | Gouillou | ............ | H04B 7/18506 |
| 9,772,712 B2 * | 9/2017 | Kneuper | ............. | G08G 5/0052 |

* cited by examiner

*Primary Examiner* — Toan N Pham
(74) *Attorney, Agent, or Firm* — Mark D. Bowen, Esq.; Malin Haley DiMaggio & Bowen, P.A.

(57) ABSTRACT

A self-contained, portable control device intended to relieve pilots of retrieving radio frequencies manually from maps, notes and directories eliminates the manual switching of frequencies on radios and other electronic devices replacing these procedures with a direct wireless link from a controlling device to the radio or other electronic device. The application of the invention is not limited to aviation but can be utilized in any utility scenario where operation calls for parameter changes, the object is conserving time and human effort, and raising standards of accuracy and system integrity. Remote control of onboard radio and other controllable electronics is achieved both by delivery of control codes and by use of a voice-to-text application. The configuration of a wireless-accessible database and a range of displays extends the application's utility to many forms of transportation, warehousing, farming, marine applications etc.

2 Claims, 3 Drawing Sheets

(Typical 2-channel/ VFR radio)

(Typical VFR radio communications flow with assigned radio frequencies)

MULTI-MODAL CONTROL SYSTEM FOR COMMUNICATIONS AND NAVIGATION IN A TRANSPORTATION ENVIRONMENT

CROSS REFERENCE TO RELATED APPLICATIONS

This application claims the benefit of provisional U.S. Patent Application Ser. No. 62/609,465, filed on Dec. 22, 2017

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally control of communications systems in transportation applications, and more particularly to a self-contained, portable control device intended to relieve pilots of retrieving radio frequencies manually from maps, notes, and directories.

2. Description of Related Art

Airports use a number of radio frequencies to place pilots in communication with various aspects of airport operations and services. This example is associated with normal aviation services such as airport conditions, ground control, tower, departure, navigation, approach and landing. These services require a number discrete radio frequencies, at least one for each separate service. A typical landing at a civil airport may require use of 5 to 10 different radio frequencies associated with local as well as area FAA facilities. These protocols differ from airport to airport. Therefore a pilot departing Airport-A and heading for Airport-B must look up the destination radio frequencies and change all radio settings. In most cases pilots make these changes while in the air. Radios are tuned and set manually. A given frequency, once identified, is manually set using a system of concentric dials or rocker switches on one of the aircraft's radios to set the frequency by controlling digits on either side of the decimal point.

Legacy aircraft radios are limited to storing two radio frequencies at any one time, an active frequency and a standby which the pilot switches between as illustrated in FIG. 1. This limit is quickly reached and the typical sequence of communications procedures calls for additional frequencies assigned to services. To add a new frequency one of the two already set must be replaced manually. In a fast-moving flight environment such as approach and landing the pilot faces a quickly growing list of tasks centered on radio communications. The pilot manages this using traditional procedures of looking up the frequencies from a directory or from a navigation chart. The pilot then sets this frequency by hand into the radio. This consumes precious time at the cost of situational awareness and contact with air traffic control. It also introduces the very real chance of errors in reading or setting typical 4-6 digit frequencies (e.g.: 132.45, 119.325). The traditional solution to these restrictions is to install multiple 2-channel radios into the aircraft in vertical configuration described as a "stack."

The FAA provides ground and flight services and associated frequencies in printed directories listed by region, by state, by airport. These publications include the Chart Supplement Directory, Instrument Approach Procedures, and Airport Diagrams. These listings are published quarterly by the FAA. It is the pilot's responsibility to locate radio frequencies assigned to services on an as-needed basis, tedious time-consuming tasks including the search for the data and resetting of the radios.

Safety issues include the occurrence of human errors in all phases of the lookup/reset operations; compromising of situational awareness due to loss of actual time allocated to recognition of conditions, receiving instructions from Air Traffic Control and events both inside and outside the cockpit in the complex and fast-moving environment of aircraft control. A documented safety issue is the legally mandated requirement (U.S. FAR 121.542/135.100) called the "sterile cockpit rule" in which outside distractions must be kept to a minimum by law.

Typical VFR approach procedures may include: a) contacting AWOS/ASOS for a weather advisory; b) contacting CTAF for non-towered control; or c) contacting Approach/Departure for a traffic advisory; d) contacting ATIS for airport conditions: winds, altimeter, active runways; e) tuning to a VOR or other directional aid; f) contacting the Control Tower for approach, traffic, landing instructions and clearance to contact Ground; g) contacting Ground for taxi instructions. Executing an IFR approach calls for the use of additional instruments and associated radio frequencies. A radio capable of only 2 frequencies, or one that can only be controlled manually inserts redundancy greatly extending the time required for overall operations compromising execution of all phases. The cost is a significant loss of situational awareness resulting in compromised flight safety.

As a result there exists a need for systems and methods to aid pilots in identifying and setting airport specific radio frequencies on cockpit radios.

BRIEF SUMMARY OF THE INVENTION

The present invention eliminates the need for looking up most radio information and respective frequencies by referencing an onboard database, and using a tablet, CRT or head up display to show the assets associated with a given airport. The present invention further automates the task of changing frequencies. A touch-screen interface is provided to select and transmit selected frequency settings directly to a wireless interface (dongle) connecting the display and the radio thereby eliminating the need for manually changing settings on the radio. A transceiver reports the radio or other device's status to the pilot.

As noted above, traditional aircraft radios store two radio frequencies at a time. Currently the only way to have more radio frequencies available for immediate use is by installing multiple radios. An object of the invention addresses this problem by creating an airport frequency database derived from the national FAA database, storing multiple radio frequencies in memory sorted by airport, and making the required frequencies available for immediate activation.

Another object of the invention is to automatically change and activate frequencies with a wireless transceiver linked to the radio itself.

Changing radio frequencies is presently accomplished by manually switching frequencies by turning mechanical dials associated with a tuner, or by scrolling an up/down display. This mechanical process is repeated for every frequency change. The invention retrieves and displays the entire array of frequencies associated with operations at an airport and provides for remote discretionary activation from touch-screen device that sends the frequency data via a Bluetooth, Wi-Fi, or other VHF signal to the radio. The only lookup required in this scenario is the airport's 3-4 character ID.

Yet another significant aspect of the present invention involves voice-to-text input that permits use of voice commands to the system to administer various control levels including airport lookups, making direct ad hoc changes on the fly to the digital interface with the radio or other electronic devices, an executing activity logs. The voice command scenario in emergency situations eliminates look-ups and manual resetting of the radio, placing the pilot in immediate contact with local facilities such as a control tower, flight service station, approach-departure, and nearby aircraft.

These and other objects are met by the present invention which will become more apparent from the accompanying drawing and the following detailed description of the drawings and preferred embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or maximum. Furthermore, such an interpretation should apply regardless of the breadth of the range or the characteristics being described.

Figure 1:
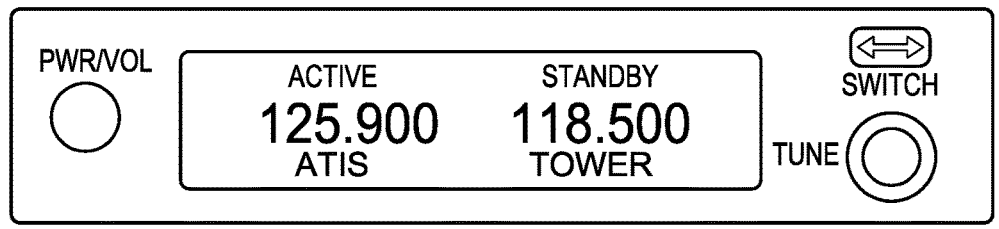
FIG. 1 is a schematic illustration of the front of an aircraft radio of the prior art.
Figure 2:
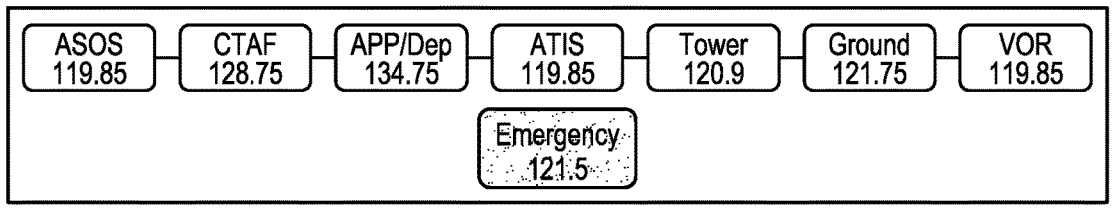
FIG. 2 is a display of frequencies associated with VFR communications flow for an airport.
Figure 3:
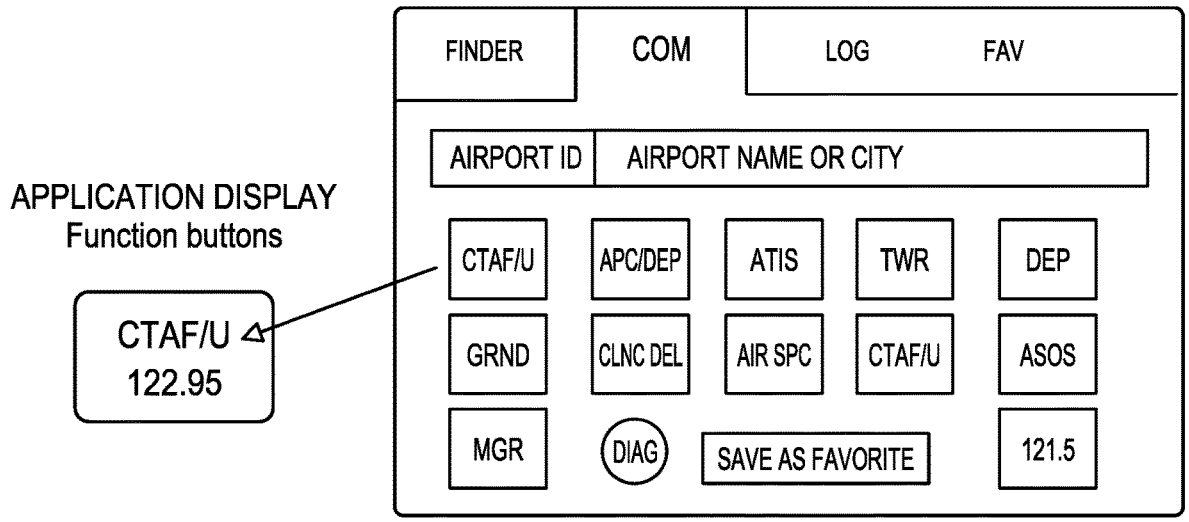
FIG. 3 is a second embodiment of a display of radio frequencies and airport identification data in accordance with the present invention.
Figure 4:
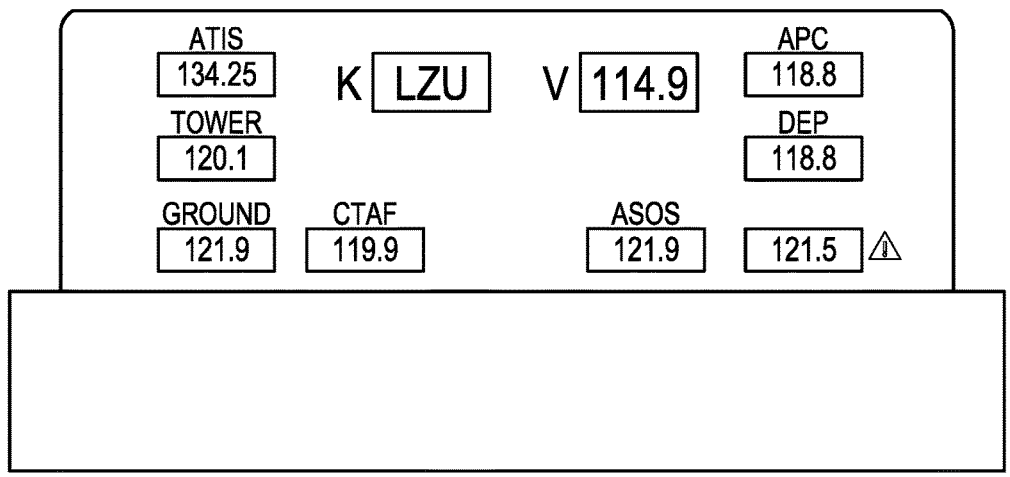
FIG. 4 is a schematic illustration of a head-up-display embodiment displaying radio frequencies and airport identification data in accordance with the present invention.

As noted above, FIG. 1 is a schematic illustration of the front panel of an aircraft radio in accordance with the prior art. FIG. 2 illustrates an example of VFR communications flow with exemplar radio frequencies associated with various aircraft facilities and operations. FIG. 3 is a schematic illustration of a display presenting radio frequencies for a selected airport in accordance with the present invention. FIG. 4 is a schematic illustration of a head-up-display ("HUD") presenting radio frequencies for a selected airport in accordance with the present invention.

Figure 5:
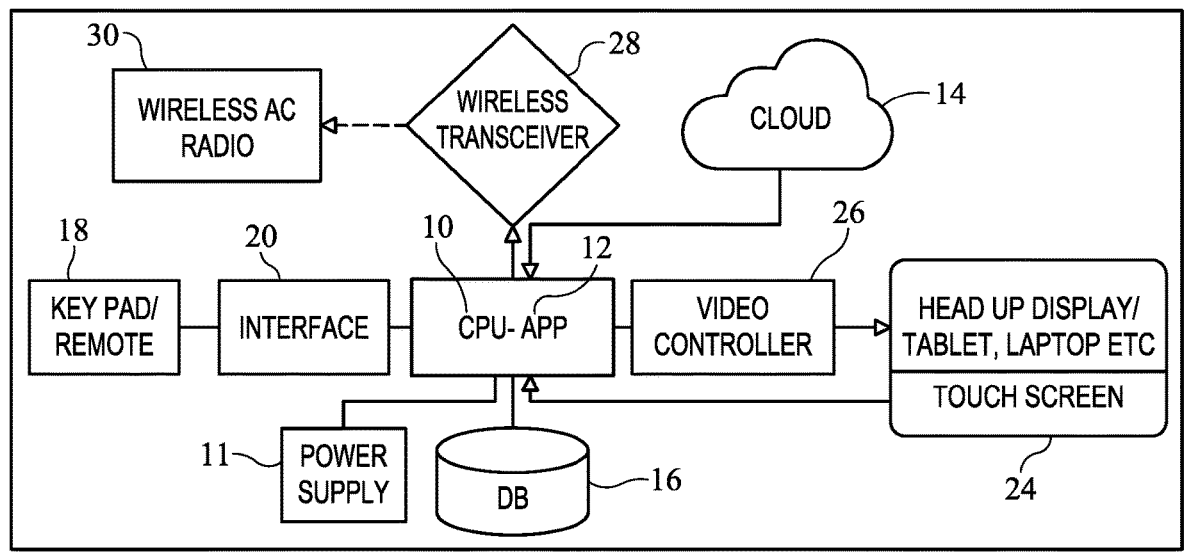
FIG. 5 is a system component block diagram for a first embodiment of the present invention.

FIG. 5 is a schematic block diagram of components configured for operation in accordance with the present invention. A central processing unit ("CPU") 10, powered by a power supply 11, receives a downloadable software application ("APP") 12 from an APP store maintained in the cloud 14, preferably via wireless communication. CPU 10 is in communication with a database 16 provided airport data (including assigned radio frequencies). Database 16 preferably comprises the national FAA database of airport facilities including all associated radio frequencies, listed by airport, by function. A keypad 18 provides input hardware to CPU 10 via an interface 20. Keypad 18 functions to allow the user to enter data to select a given airport. After specifying the airport's name, city or short identifier, APP 12 retrieves the selected airport's frequencies displaying them on a screen or head up display 24 via a video controller 26. The pilot chooses from among the data fields identified by function with its frequency and taps this position on, e.g. the touch screen. The activated bit-map instructs the application to send encoded data to the device's wireless transceiver 28 which then transmits it to the remote radio 30.

The hardware and data components used by the present invention include: (a) National FAA Airport Facilities database 16; (b) a tablet PC such as iPad or Samsung for storing all controlling software and FAA data represented by CPU 10 and App12; (c) installed or accessorized portable VHF radio 30 and possibly other controllable instruments; (d) Software application 12 for controlling data access, signal transfer, downloading of data updates; (e) a touch-sensitive display 24 to show facilities and radio information and provide a gateway to the interface; and (f) a Bluetooth/Wi-Fi transceiver 28 for communicating with external devices and transmitting data.

The pilot uses the application to select an airport. The airport's communications data is retrieved and displayed. The pilot chooses an operation with the associated frequency intended for the radio by tapping on the touch-sensitive display. The application encodes the frequency and transmits it directly to the radio via a wireless interface (dongle). The radio is equipped with an interpreter which permits setting radio to the specified frequency. Radio frequencies are provided by an FAA database 16 which is updated every 28 days. These updates are transmitted directly to the application appliance automatically in the vicinity of any local Wi-Fi network.

Tablets and laptops have 3-6 hours of auxiliary power. The currently configured digital radio has a rechargeable standby battery that will provide two hours of operation. If the transceiver or the radio's wireless receiver fails, the radio can be set manually from traditional information sources. The device can be used alternatively as an expedient guide for use with traditional radios lacking a wireless controller interface. The national access database sorted by airport is available, however the pilot must set his radio manually. The conserved time and effort in avoiding use of printed directories remains significant.

Figure 6:
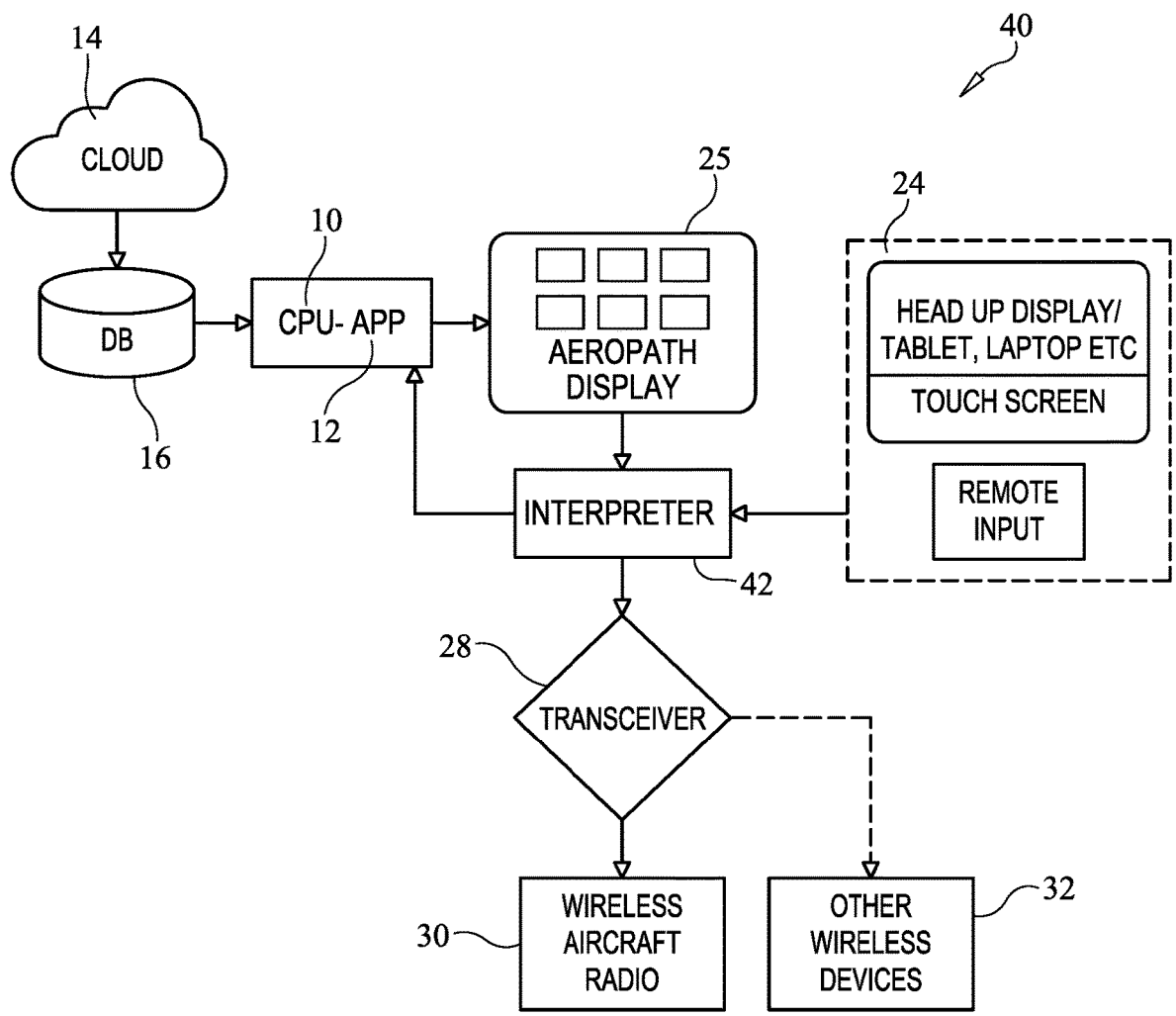
FIG. 6 is a system component block diagram for a second embodiment of the present invention incorporating voice to text functions.

FIG. 6 illustrates an alternate embodiment, generally referenced as 40, that involves voice-to-text input that permits use of voice commands to the system to administer various control levels including airport lookups, making direct ad hoc changes on the fly to the digital interface with the radio or other electronic devices, an executing activity logs. The voice command scenario in emergency situations eliminates lookups and manual resetting of the radio, placing the pilot in immediate contact with local facilities such as a control tower, flight service station, approach-departure, and nearby aircraft.

The hardware and data components used by the present invention include: (a) National FAA Airport Facilities database 16; (b) a tablet PC such as iPad or Samsung for storing all controlling software and FAA data represented by CPU 10 and App12; (c) installed or accessorized portable VHF radio 30 and possibly other controllable instruments or devices 32; (d) Software application 12 downloaded from an APP store located in the cloud 14 for controlling data access, signal transfer, downloading of data updates; (e) a touch-sensitive display 24, or alternatively 25, to show facilities and radio information and provide a gateway to the interface; (f) a Bluetooth/Wi-Fi transceiver 28 for communicating with external devices and transmitting data; and (g) an voice-to-text interpreter 42 which functions to convert cockpit voice commands, as well as communications received within the cockpit (such as from the control tower) into text files that may be saved and/or used to select various airports or airport frequencies. For example, a pilot flying to Fort Lauderdale International Airport may simply say "FLL" and the voice-to-text interpreter 42 will convert that command such that the airport data for that airport is retrieved by the system and displayed. The pilot can then change the frequency of the radio to one of the displayed frequencies by merely saying e.g. "Tower" whereby transceiver 28 will send a command to the wireless enabled aircraft radio 30 to set the radio's active frequency setting to the appropriate frequency.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A self-contained, portable aviation radio frequency database system that automates retrieval of radio frequencies used in normal course of aviation communications, said system comprising:

a portable computer including a data storage component, said data storage component having controlling software and FAA data stored thereon;

said FAA data including a plurality of data sets, each of said data sets corresponding to a particular airport, and each of said data sets including radio frequency data corresponding to said particular airport;

a wireless transceiver configured to communicate with an external radio; a touch-sensitive electronic display configured to display a selected airport and all icons corresponding to radio frequency information for said selected airport on a single screen; a national FAA Chart Supplement database;

a software application for controlling data access and signal transfer; a remote or built-in alphanumeric key entry; a portable battery-operated power supply;

means for transferring a selected frequency from said database to said external radio by selecting on of said icons without requiring scrolling, whereby said radio is tuned to said selected frequency.

2. A self-contained, portable aviation radio frequency database system that automates retrieval of radio frequencies used in normal course of aviation communications and wirelessly transmits radio frequencies to an external radio, said system comprising:

a portable computer including a data storage component, said data storage component having controlling software and FAA data stored thereon;

said FAA data including a plurality of data sets, each of said data sets corresponding to a particular airport, and each of said data sets including radio frequency data corresponding to said particular airport;

a wireless transceiver configured to communicate with the external radio; a touch-sensitive electronic display configured to display a selected airport and icons corresponding to all radio frequency information for said selected airport;

a software application for controlling data access and signal transfer;

means for wirelessly transmitting user selected radio frequency information to the external radio from said database in response to user selection of one of said displayed icons, such that said radio is tuned to said selected frequency.

\* \* \* \* \*